United States Patent
Pak

(10) Patent No.: US 9,772,984 B2
(45) Date of Patent: Sep. 26, 2017

(54) VISUALIZATION INTERFACE FOR INFORMATION OBJECT SYSTEM

(71) Applicant: Systemic Management Science Corporation, Charlottesville, VA (US)

(72) Inventor: Jae W. Pak, Charlottesville, VA (US)

(73) Assignee: Systemic Management Science Corporation, Charlottesville, VA (US)

( * ) Notice: Subject to any disclaimer, the term of this patent is extended or adjusted under 35 U.S.C. 154(b) by 641 days.

(21) Appl. No.: 14/208,346

(22) Filed: Mar. 13, 2014

(65) Prior Publication Data

US 2016/0321223 A1 Nov. 3, 2016

Related U.S. Application Data

(60) Provisional application No. 61/787,688, filed on Mar. 15, 2013.

(51) Int. Cl.
*G06F 3/0482* (2013.01)
*G06F 3/0488* (2013.01)
*G06F 17/22* (2006.01)
*G06F 17/30* (2006.01)
*G06F 9/44* (2006.01)
*H04L 29/08* (2006.01)

(52) U.S. Cl.
CPC ........ *G06F 17/2288* (2013.01); *G06F 3/0482* (2013.01); *G06F 3/04883* (2013.01); *G06F 9/4443* (2013.01); *G06F 17/30994* (2013.01); *G06F 17/30997* (2013.01); *H04L 67/1097* (2013.01)

(58) Field of Classification Search
CPC .... G06F 3/0482; G06F 17/22; G06F 17/2288; G06F 17/30997; G06F 3/04883; G06F 9/44
See application file for complete search history.

(56) References Cited

U.S. PATENT DOCUMENTS

| 5,933,597 A * | 8/1999 | Hogan | G06F 9/54 709/204 |
| 2009/0327277 A1 * | 12/2009 | Sanborn | G06F 17/211 |
| 2012/0209816 A1 | 8/2012 | Bank et al. | |
| 2014/0063042 A1 * | 3/2014 | Hernandez | G06F 8/38 345/592 |

FOREIGN PATENT DOCUMENTS

WO 2008006197 A1 1/2008

OTHER PUBLICATIONS

S. C. Kabel "The role of ontologies in the material handling processes"; Oct. 20, 2004; p. 36-64.
European Search Report and Opinion; dated Sep. 13, 2016.

* cited by examiner

*Primary Examiner* — Andrea Leggett

(74) *Attorney, Agent, or Firm* — Thomas Horstemeyer, LLP

(57) ABSTRACT

Disclosed are various embodiments for presenting an interface for visualizing information objects. A user interface is generated on a client computing device. Then a collaboration server may be queried for an information object to be rendered within the user interface on behalf of a user in response to a request to render the information object. Subsequently, form data may be retrieved from the information object received from the collaboration server. Then the information object may be rendered within the user interface based at least in part on the form data of the information object.

21 Claims, 15 Drawing Sheets

VISUALIZATION INTERFACE FOR INFORMATION OBJECT SYSTEM

CLAIM OF PRIORITY

This application claims priority to and the benefit of U.S. Provisional Application, Ser. No. 61/787,688, filed on Mar. 15, 2013, and incorporated by reference herein in its entirety.

FEDERALLY SPONSORED RESEARCH

This invention was made with Government support under Contact No. W31P4Q-10-C-0010 awarded by the Defense Advanced Research Projects Agency ("DARPA"). The Government has certain rights in the invention.

BACKGROUND

Information is stored on computers in files and other data formats. Various applications may use the files, or other data formats, to present the information in a manner that is conducive to human understanding. The applications may further show relationships between separate pieces of information in a manner that is conducive to human understanding.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Concept maps and mind maps often facilitate better inspection of existing knowledge structures for more rapid identification of misconceptions or relationships that require more in-depth analysis. The use of computer based concept mapping tools can enhance higher-quality analyses through the creation of structural representation of the knowledge domain of complex concepts. In this manner, with concept map and mind map briefings, both the creators and consumers of content are expected to be able to more rapidly assess whether the information and analysis at hand has analytic integrity and value and thus determine whether further refinement of the analysis is required.

In the following discussion, a general description of the system and its components is provided, followed by a discussion of the operation of the same.

Figure 1:
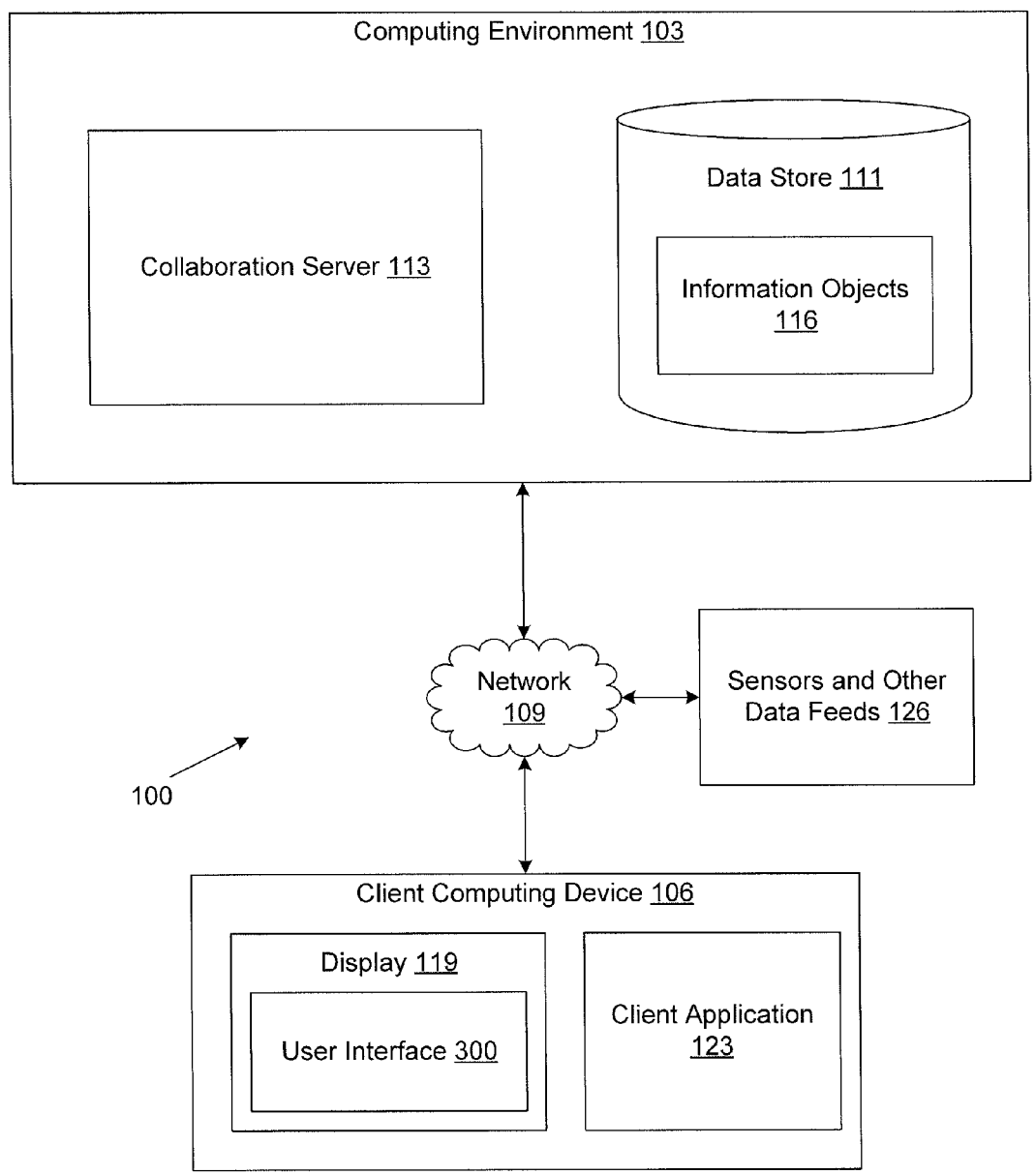
FIG. 1 is a drawing of a networked environment according to various embodiments of the present disclosure.

With reference to FIG. 1, shown is a networked environment 100 according to various embodiments. The networked environment 100 includes a computing environment 103 and a client computing device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 111 that is accessible to the computing environment 103. The data store 111 may be representative of a plurality of data stores 111 as can be appreciated. The data stored in the data store 111, for example, is associated with the operation of the various applications and/or functional entities described below.

The components executed on the computing environment 103, for example, include a collaboration server 113, and other applications, services, processes, systems, engines, or functionality not discussed in detail herein. The collaboration server 113 is executed to allow one or more users to create and share one or more information objects 116 and potentially other data.

The data stored in the data store 111 includes, for example, one or more information objects 116, and potentially other data.

Information objects 116 are data storage objects structured to model data based on the relationships between individual pieces of information. As such, information objects 116 may comprise a set of associations with other information objects 116 to indicate data relationships. For example, a link between two information objects 116 may indicate a data dependency, a structural hierarchy, or other association of data modeled by two or more information objects 116. Information objects 116 may also be assembled and/or derived from other information objects to represent these relationships. As such most information objects 116 may be created from or represented by an assembly of other information objects 116.

However, some types or classes of information objects 116 may be reserved for particular types of data which cannot easily be represented as a combination of two or more other information objects 116. For example, repeating data blocks, such as images, sound, video, compressed data, and encrypted data, may require a reserved or unique instance of an information object 116 that functions as a wrapper for the underlying data. Continuous stream data, such as a stream of data from a sensor, may also require a unique or reserved instance of an information object 116 to represent the stream data because stream data has a beginning but not necessarily an end to the data.

The client computing device 106 is representative of a plurality of client computing devices that may be coupled to the network 109. The client computing device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client computing device 106 may include a display 119. The display 119 may comprise, for example, one or more devices such as liquid crystal display (LCD) displays, gas plasma-based flat panel displays, organic light emitting diode (OLED) displays, LCD projectors, or other types of display devices, etc.

The client computing device 106 may be configured to execute various applications such as a client application 123 and/or other applications. The client application 123 may be executed in a client computing device 106, for example, to access network content served up by the computing environment 103 and/or other servers, thereby rendering a user interface 300 on the display 119. To this end, the client application 123 may comprise, for example, a browser, a dedicated application, etc., and the user interface 300 may comprise a network page, an application screen, etc. The client computing device 106 may be configured to execute applications beyond the client application 123 such as, for example, email applications, social networking applications, word processors, spreadsheets, and/or other applications.

In addition, one or more sensors and other data feeds 126 may be in network communication with the collaboration server 113 or the client application 123. Sensors and other data feeds may comprise any electronic device capable of generating or recording data and transmitting the data to the collaboration server 113. Examples of sensors and other data feeds 126 include accelerometers, temperature sensors or thermostats, video or web cameras, microphones, noise sensors, pressure sensors, scales, timers, flow meters, light sensors, outputs or results of applications or programs, and other such devices or programs.

Although FIG. 1 depicts a network-centric configuration representing a client-server model, this does not preclude other configurations. For example, in some embodiments the client computing device 106 may be a computing device located within the computing environment 103. In various embodiments, the client application 123 may be located in the computing environment 103 along with the collaboration server 113, but the client application 123 may communicate or render the user interface 300 on the display 119 of the client computing device 106. In other embodiments, the collaboration server 113, the data store 111, and the client application 123 may all be located within a single computing device, such as the client computing device 106 or a single computer within the computing environment 103.

Next, a general description of the operation of the various components of the networked environment 100 is provided. To begin, the client application 123 makes a request for one or more information objects 116 for use in a presentation, report, or similar document.

Upon receiving the requested information objects 116, the client application 123 presents the requested information objects 116 to the user through the user interface 300. The user may interact with the information objects 116 as desired.

For example, the user may select one or more information objects 116 for the basis of a presentation. Each information object 116 may correspond to a slide image or diagram within the presentation.

Alternatively, the user may interact with an information object 116 to select a child information object 116, or otherwise "drill down" to look at the underlying data associated with the information object 116. For example, the user may select an information object 116 labeled "bacteria." Within the information object 116 labeled bacteria, a list of bacteria may be provided. Each listing corresponding to a child information object. Should the user select a child information object 116, information related to the child information object 116 may be surfaced to the user, where such information was not previously visible to the user.

In another non-limiting example, the user may choose to create one or more information objects 116 to represent data or information that is not currently within the system. To continue with the bacteria example, a user may choose to create a new information object 116 associated with the "bacteria" information object 116 that represents a newly discovered bacterium. Further, in some embodiments of the present disclosure, a newly created information object 116 may be uploaded to the collaboration server 113 in order to be stored within the data store 111 for future use by the user or other users.

Figure 2:
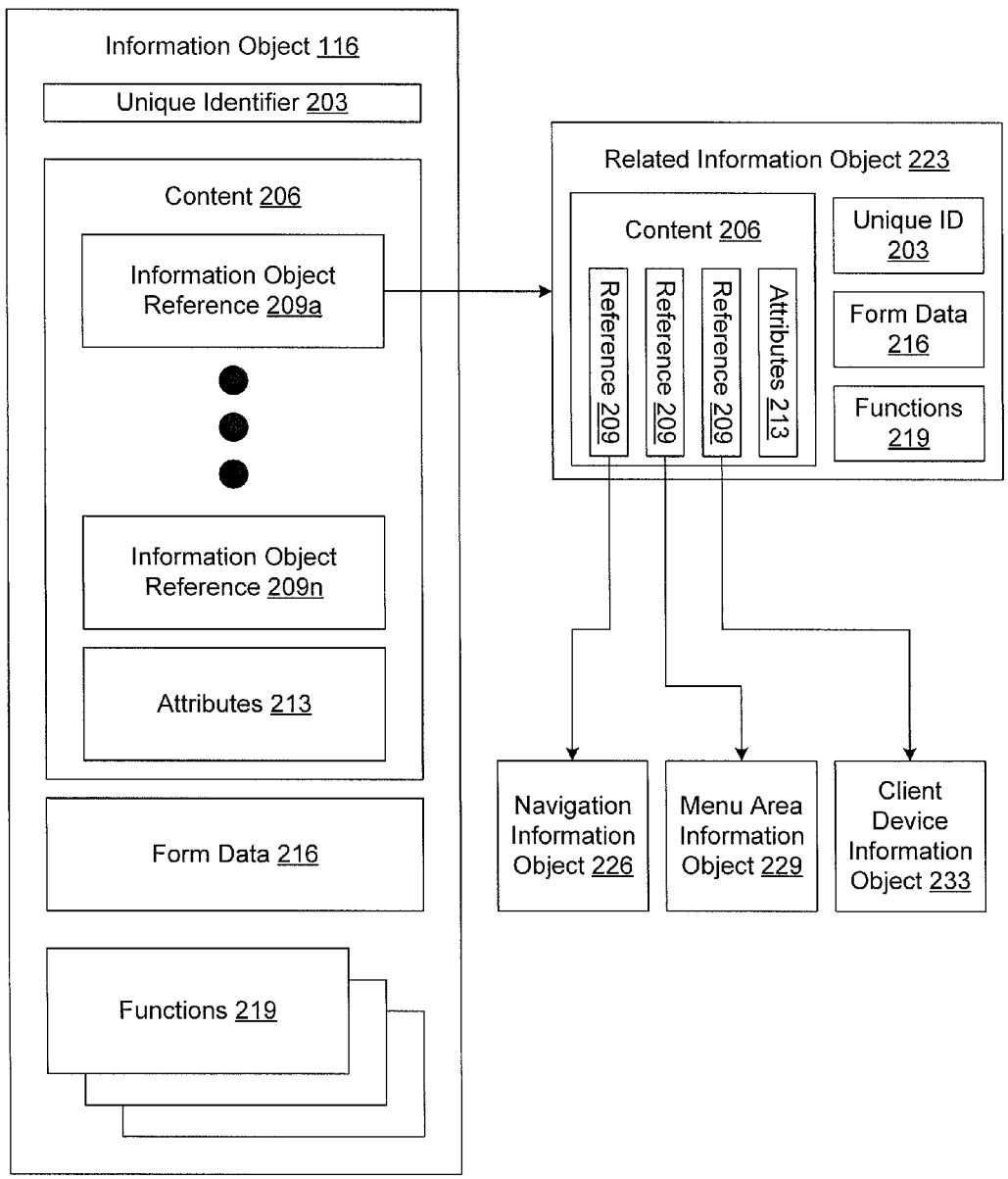
FIG. 2 is a drawing of an Information Object as depicted in the networked environment of FIG. 1 according to various embodiments of the present disclosure.

Referring next to FIG. 2, shown is a depiction of the data structure of an information object 116. Each information object 116 has at least one unique identifier 203, which uniquely identifies a particular instance of an information object 116 within the data store 111 (FIG. 1). Each information object 116 also includes content 206. Included in the content 206 of the information object 116 may be one or more information object references, such as information object reference 209a through information object reference 209n. The content 206 of the information object 116 may also include attributes 213 describing the information object 116. In addition, the information object 116 may include form data 216 and multiple functions 219.

A unique identifier 203 may be either a unique alphanumeric number, such as the result of a cryptographic hash function, or may be a unique number generated by the collaboration server 113 (FIG. 1) when the information object 116 is created. For example, the collaboration server 113 may apply a cryptographic hash function, such as a version of the Secure Hash Algorithm, to an information object 116 to generate the unique identifier 203. In another example, the collaboration server 113 may increment a counter when the information object 116 is created and then set the unique identifier 203 equal to the value of the counter. In some embodiments, both approaches may be combined to minimize the risk of collisions from the cryptographic hash function or duplicate counter values resulting from integer overflow errors. For example, the counter may be incremented and the value prepended or appended to the result of a cryptographic has function to create a unique identifier 203.

The content 206 corresponds to the data represented by an information object 116, which may include one or more information object references 209a . . . n and/or one or more attributes 213. Each information object reference 209a . . . n points or links to a related information object 223. A related information object 223 may correspond to information that is a component of the information object 116 or is related to the information object 223 in some manner. For example, an information object 116 representing the country "Russia" may have an information object reference 209 linking the information object 116 to a related information 223 corresponding to the city "Moscow." The information object 116 representing "Russia" may also include a second information object reference 209 to a related information object 223 representing a list of countries and a third information object reference 209 to a related information object 223 representing "Communism."

The attributes 213 of the information object 116 represent data stored within the Information Object 116 which may or may not be directly presented to the user as main content. Attributes 213 of an information object 116 may include, for example, a username of a user who originally created the information object 116, a username of each user who has modified the information object 116, a timestamp recording the creation of the information object 116 and/or modification of the information object 116, a version of the interface standard supported by the information object 116 for use with the collaboration server 113 (FIG. 1) or the client application 123 (FIG. 1), language and/or cultural identification, and other such data. In some instances, the attributes 213 themselves may be represented by other information objects 116. For example, a username of the creator of an information object 116 may be represented by an information object 116 that represents a user account.

The form data 216 corresponds to the data necessary to represent or display an information object 116 on a display 119 (FIG. 1). For example, form data 216 may represent the size of the information object 116 on the display 119, the location of the information object 116 on the display 119, a transparency value of the information object 116, whether to overlay or underlay the information object on the display 119 with respect to individual ones of the related information objects 223, and similar data or values. In some instances, the form data 216 may further specify the default placement of related information objects 223 on a display 119 relative to the information object 116.

The functions 219 correspond to programmatic interfaces, methods, or similar mechanisms through which the client application 123 (FIG. 1) or the collaboration server 113 may interact with or otherwise manipulate the information object 116. For example, the functions 219 may include functions for setting an information object 116 visible or invisible on a display 119, functions for editing or otherwise modifying the information object 116, functions for creating new information object references 209 or otherwise linking an information object 116 to a related information object 223.

An information objection 116 or a related information object 223 may also have individual information object references 209 corresponding to user interface elements represented by information objects, such as a navigation information object 226, a menu area information object 229, and a client device information object 233. For example, the navigation information object 226 may describe or define the structure or relationships of the currently selected information object 116 in relation to other information objects 116. In some embodiments, the menu area information object 229 may describe or define various menu or other user interface 300 (FIG. 1) components which may be used to interact with the information object 116, such as editing, copying or deleting the information object 116. In some embodiments, the menu area information object 229 may also provide for functionality to create new information objects 116. Further, in some embodiments, the client device information object 233 may contain user and system-wide settings, such as sound volume, display brightness, network connectivity settings, and other settings.

Figure 3A:
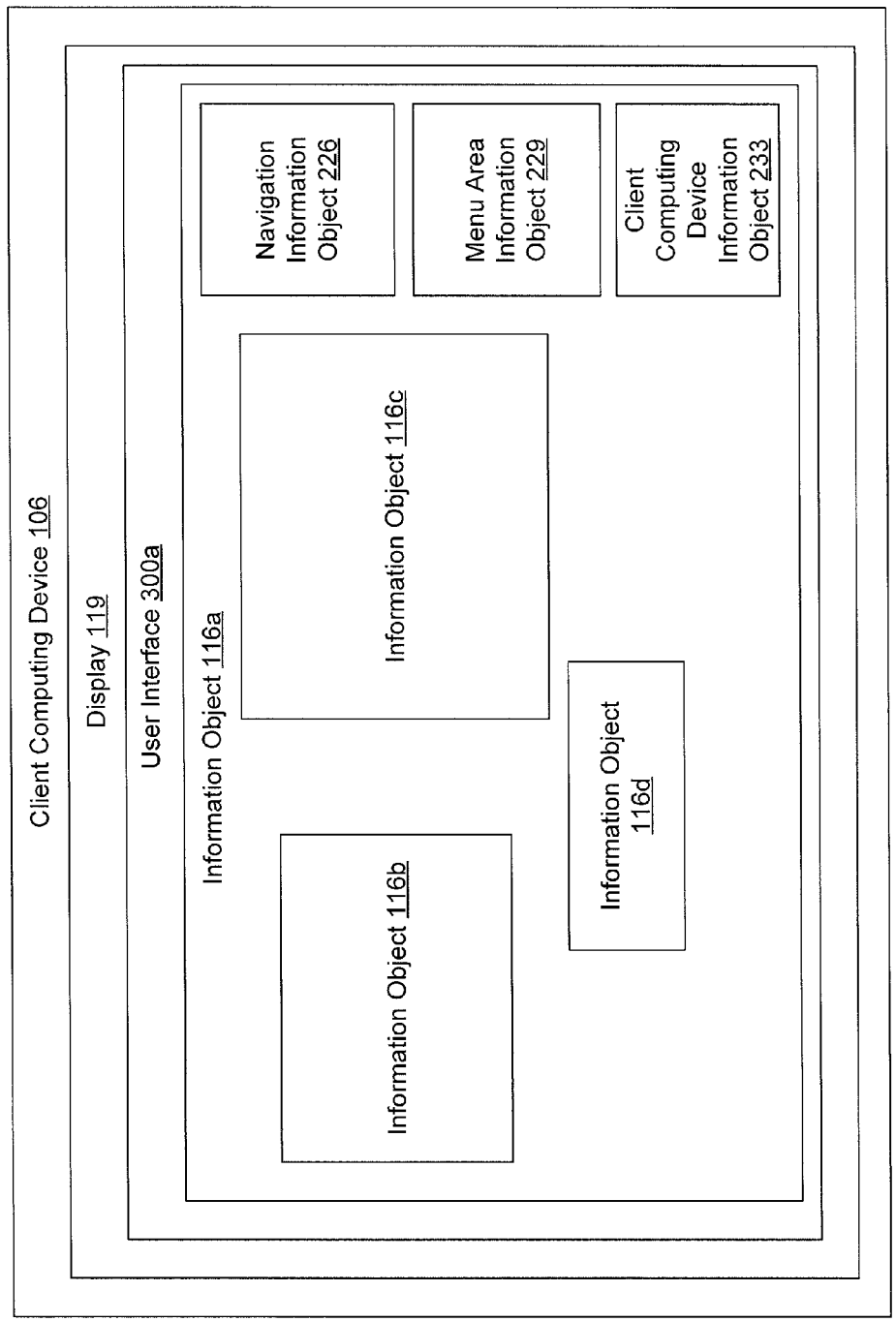
FIG. 3A-G are drawings of examples of a user interface rendered by a client in the networked environment of FIG. 1 according to various embodiments of the present disclosure.

Moving to FIG. 3A, shown is an example user interface 300, denoted herein as 300a, of the client application 123 (FIG. 1) executing on the client computing device 106. As illustrated, an information object 116a may have other, related information objects 116b, 116c, and 116d overlaid on top of the information object 116a, permitting a user to visualize the relationships between the information objects 116a, 116b, 116c, and 116d. Whichever information object 116 is currently selected by the user, or otherwise in focus, may have a corresponding navigation information object 226, menu area information object 229, and client computing device information object 233 displayed.

Figure 3B:
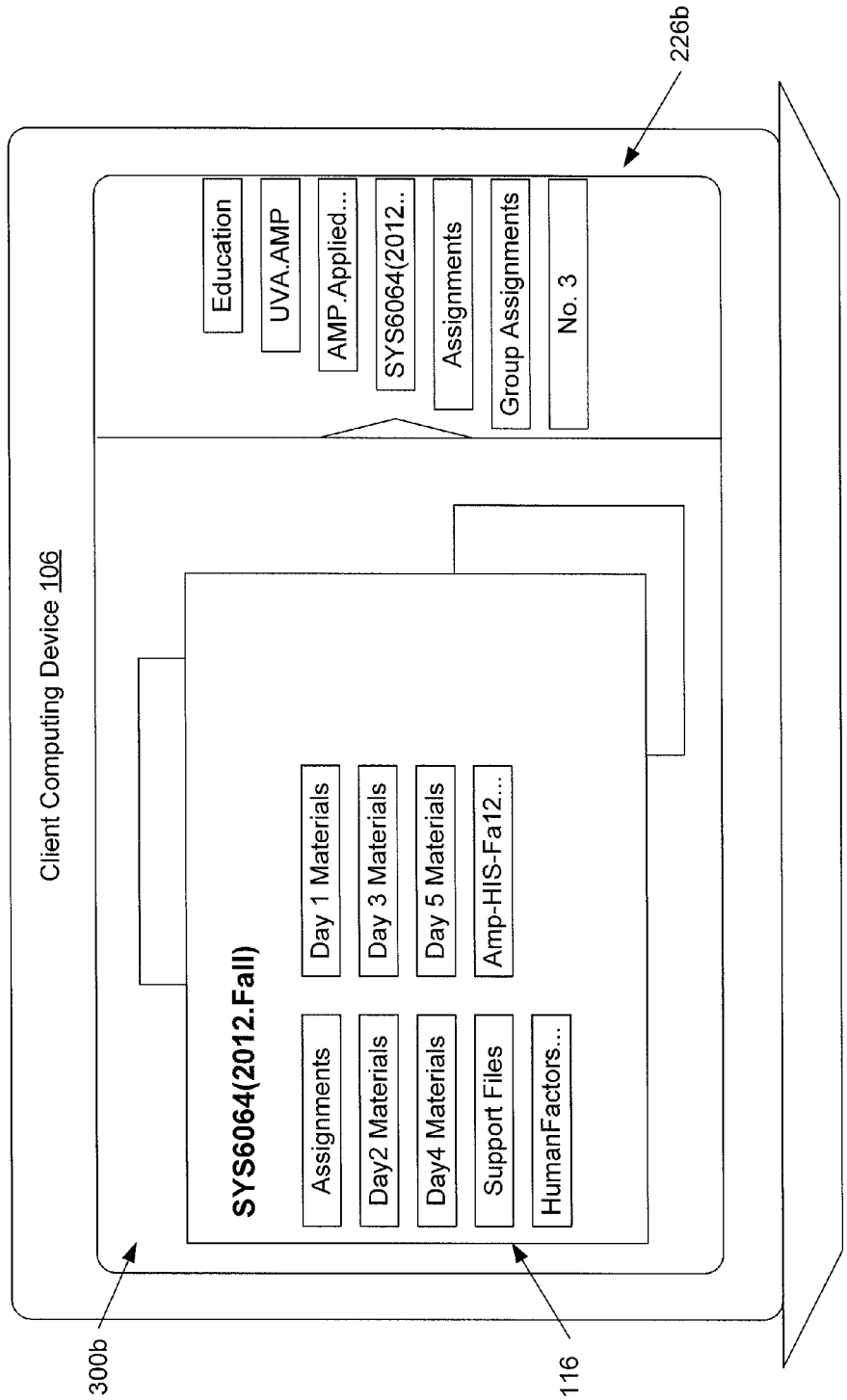

Referring next to FIG. 3B, shown is an example user interface 300, denoted herein as 300b, of the client application 123 (FIG. 1) executing on the client computing device 106. Shown to the right is a navigation information object 226 (FIG. 2), denoted herein as navigation bar 226b, comprising a number of information objects 116. In this particular user interface 300b, an information object 116 has been selected and is displayed in the middle of the screen.

Figure 3C:
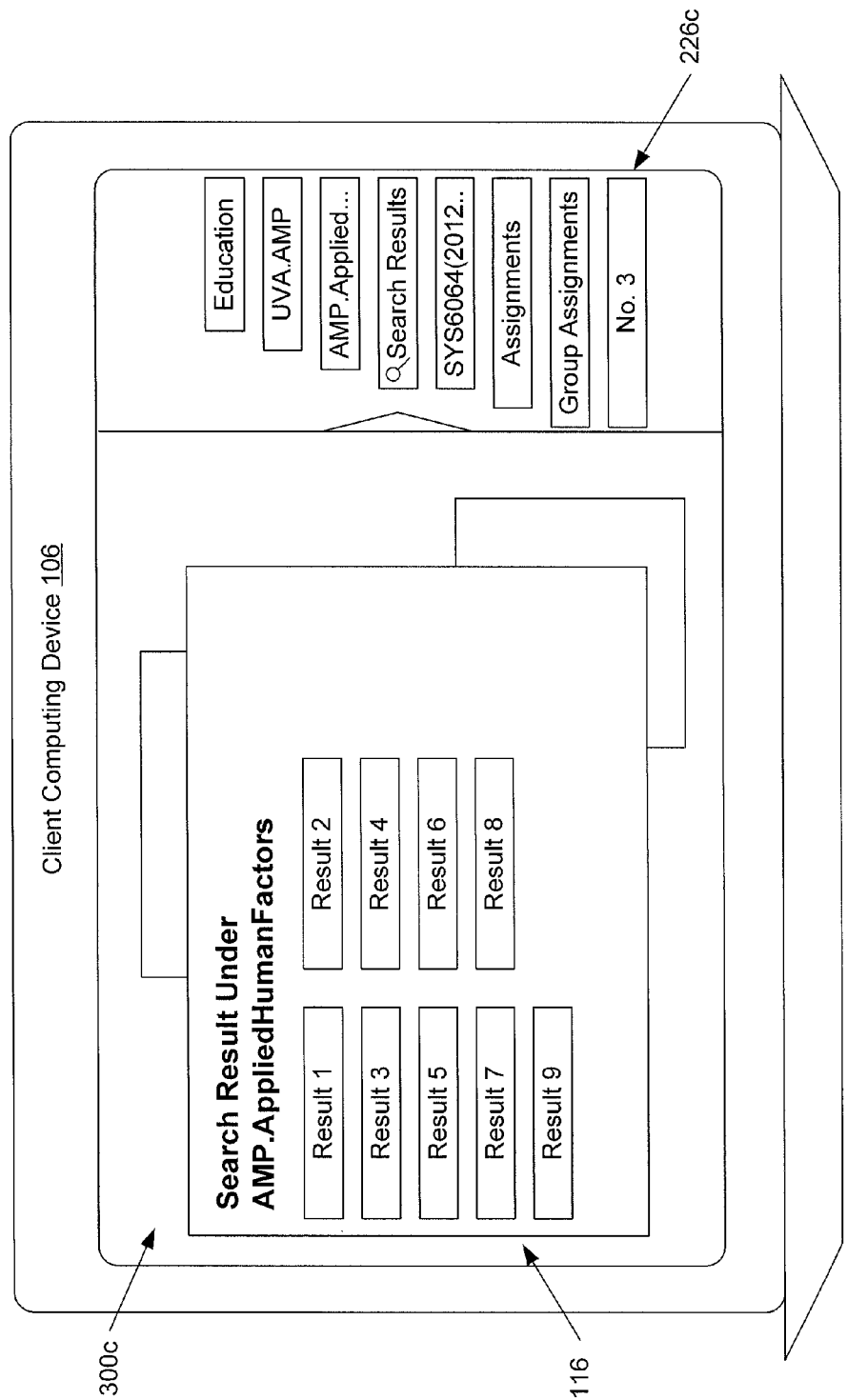

Turning now to FIG. 3C, shown is an example user interface 300, denoted herein as 300c, of the client application 123 (FIG. 1) executing on the client computing device 106. Shown to the right is a navigation information object 226 (FIG. 2), denoted herein as 226c, comprising a number of information objects 116. In this particular user interface 300c, a use has selected another information object 116 and the user interface 300c has changed accordingly.

Figure 3D:
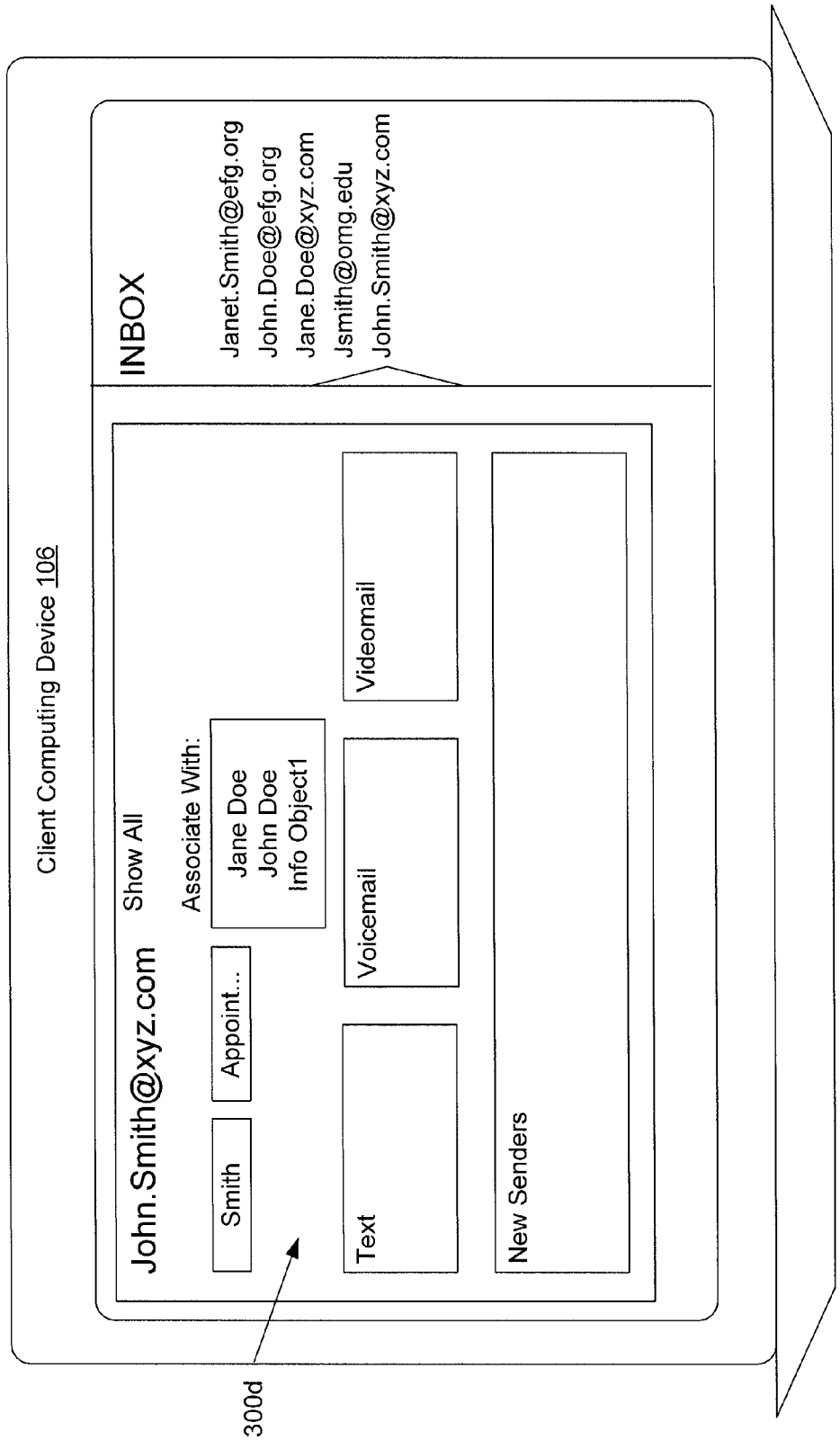

Moving on to FIG. 3D, shown is an example user interface 300, denoted herein as 300d, of the client application 123 (FIG. 1) executing on the client computing device 106. This particular user interface 300d shows the ability of a user of the client application 123 to associate one or more information objects 116 (FIG. 1) together.

Figure 3E:
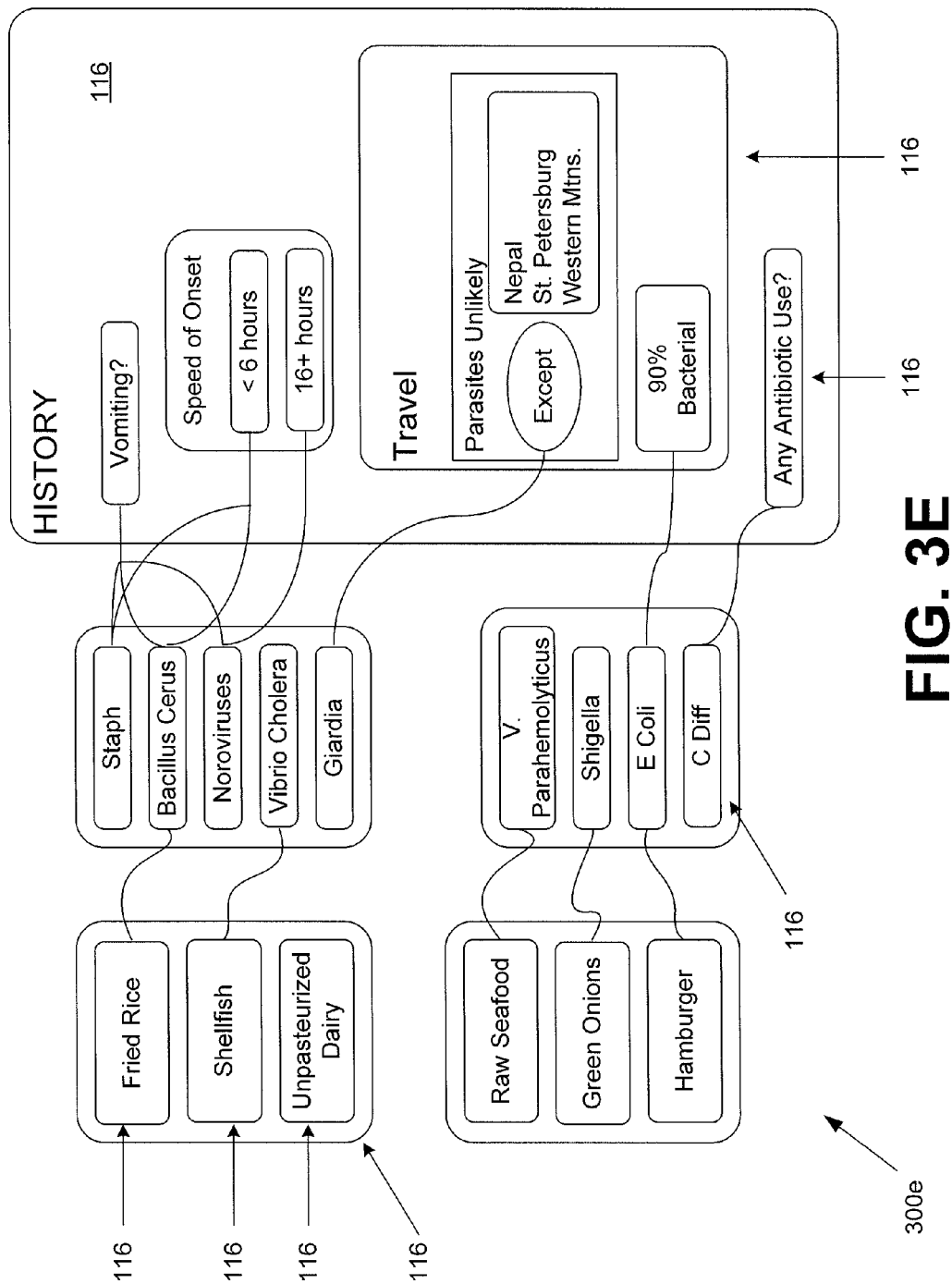

Turning now to FIG. 3E, shown is an example user interface 300, denoted herein as 300e, of the client application 123 (FIG. 1) executing on the client computing device 106 (FIG. 1). The user interface 300e displays a number of information objects 116, wherein each information object 116 includes information about one or more topics which are each embodied by a corresponding information object 116.

Further, relationships between information objects 116 are depicted in order to properly convey the relationship of information.

Figure 3F:
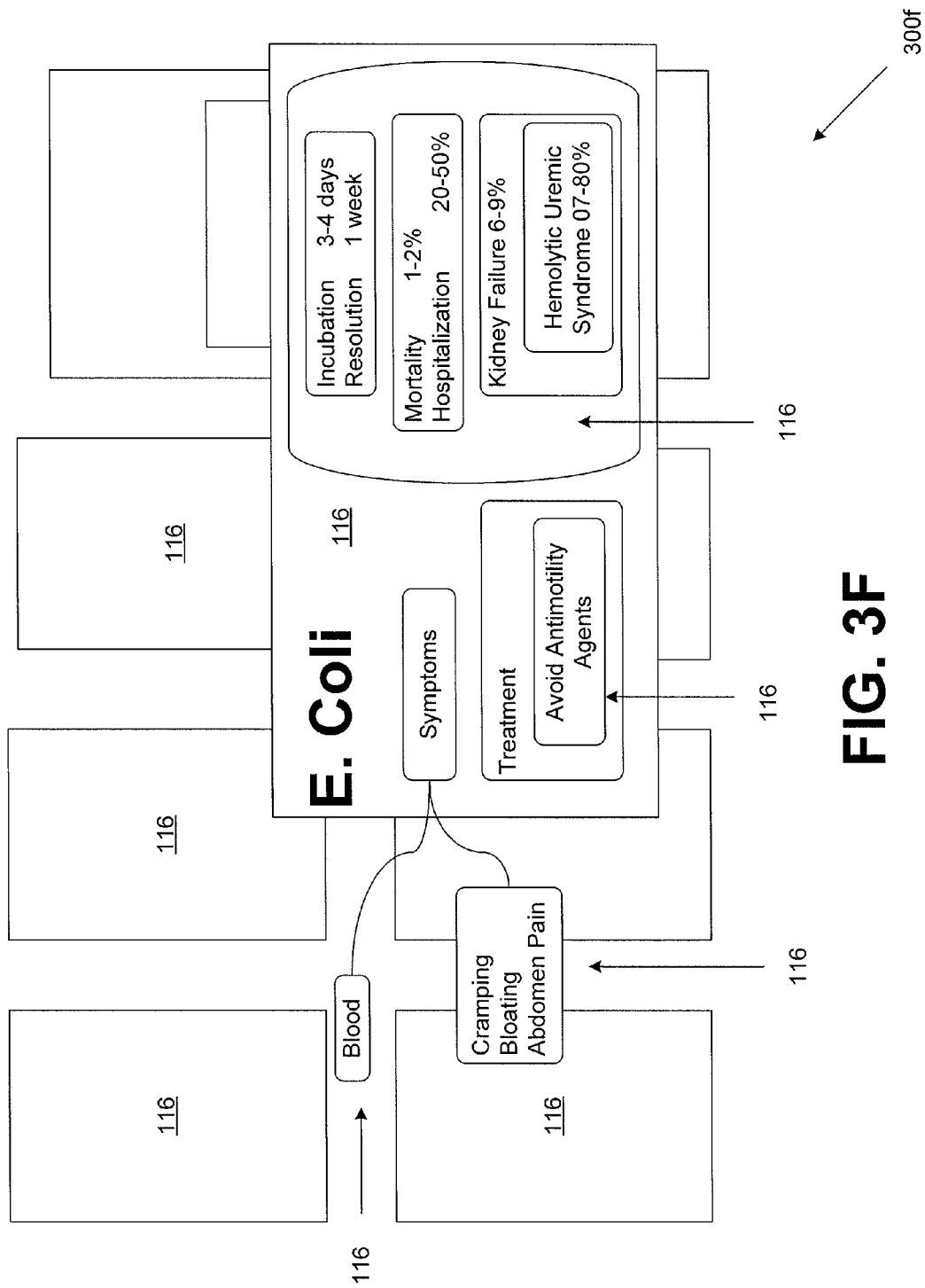

Turning now to FIG. 3F, shown is an example user interface 300, denoted herein as 300f, of the client application 123 (FIG. 1) executing on the client computing device 106 (FIG. 1). The user interface 300f depicts the presentation of a child information object 116. In this particular example, a user has selected the *E. Coli* information object depicted in user interface 300e (FIG. 3E), which has caused the client application 123 to surface the information object 116 for E. Coli to the forefront of the user interface 300f. Other information objects 116 have been moved to the background and/or blurred, had any focus removed, or otherwise deemphasized in order to avoid distracting the focus of the user from the surfaced information object 116.

Figure 3G:
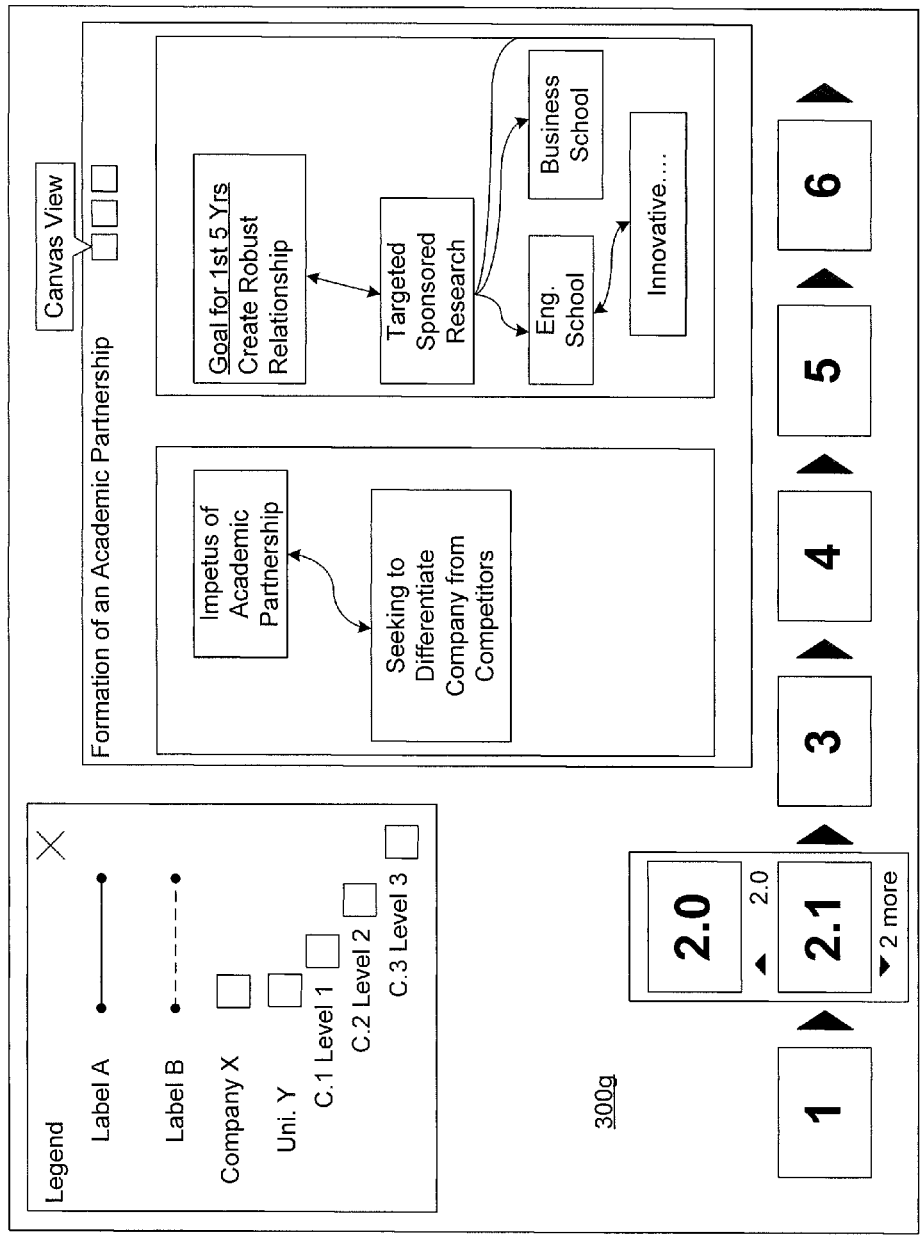

Turning now to FIG. 3G, shown is an example user interface 300, denoted herein as 300g, of the client application 123 (FIG. 1) executing on the client computing device 106. The user interface 300g depicts a user creating one or more information objects 116 (FIG. 1). Such information objects 116 may be stored for future reference, or may be used for the purpose of creating a presentation, report, or similar document.

Figure 4:
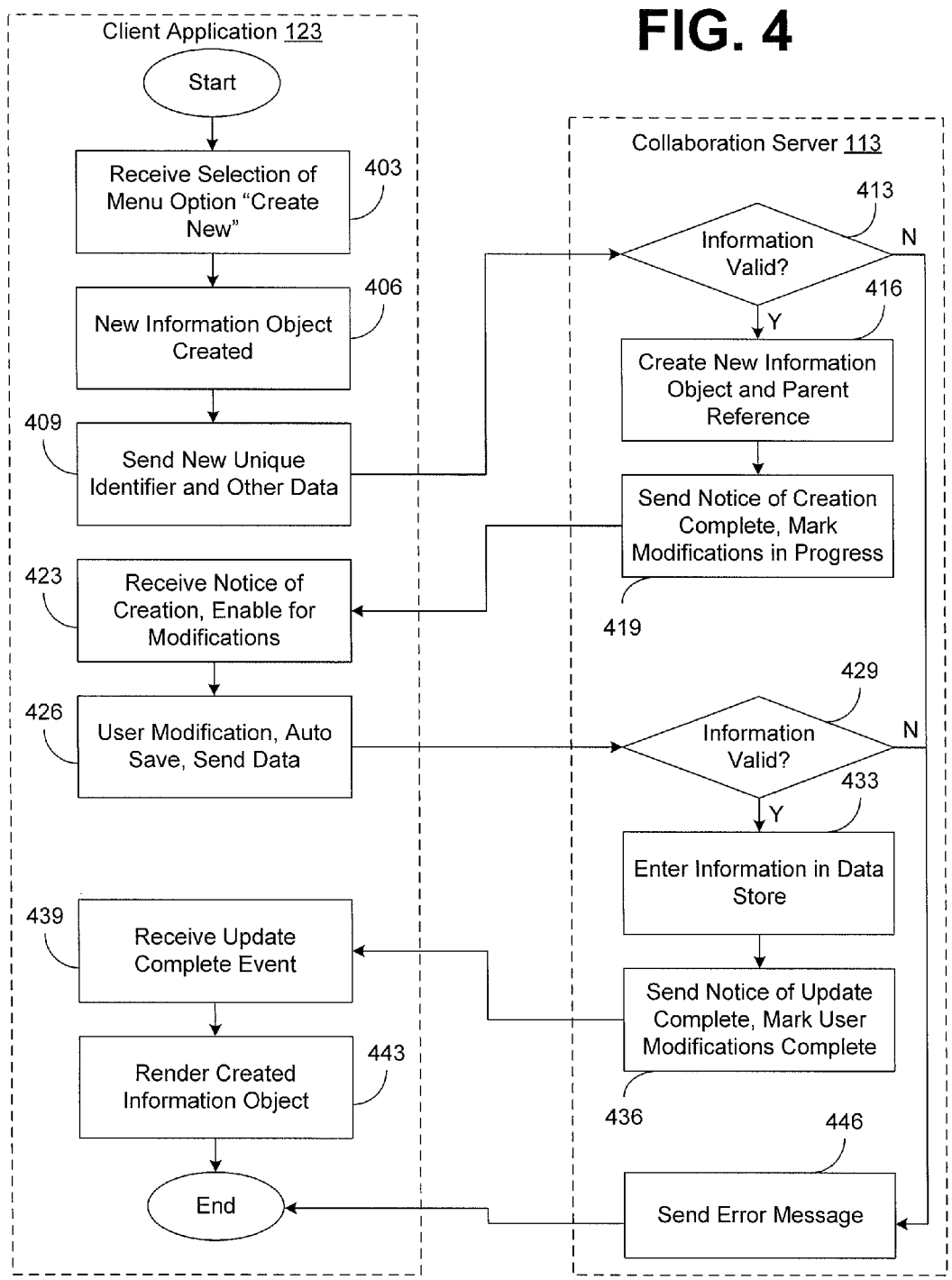
FIG. 4 is a flowchart illustrating one example of functionality implemented as portions of a client application and a collaboration server executed in the networked environment of FIG. 1 according to various embodiments of the present disclosure.

FIG. 4 shows a flowchart that provides one example of the operation of a portion of the client application 123 and the collaboration server 113 according to various embodiments. It is understood that the flowchart of FIG. 4 provides merely an example of the many different types of functional arrangements that may be employed to implement the operation of the portions of the client application 123 and the collaboration server 113 as described herein. As an alternative, the flowchart of FIG. 4 may be viewed as depicting an example of elements of a method implemented in the networked environment 100 (FIG. 1) according to one or more embodiments.

Beginning with box 403, the client application 123 receives a selection of "Create New" or similar option through a user interface 300 (FIG. 1) of the client application 123 indicating that a user wishes to create a new information object 116 (FIG. 2). In some embodiments, for example, the user may have made a selection to create a new information object 116 by interacting with a menu area information object 229 (FIG. 2).

Subsequently at box 406, the client application 123 creates a new information object 116 locally. In some embodiments, the new information object 116 may be locally cached for immediate use by the client application 123 pending an upload of the newly created information object 116 to the collaboration server 113. In some embodiments, the client application 123 may further assign a unique identifier 203 (FIG. 2) to the newly created information object 116 and populate the content 206 (FIG. 2) and form data 216 (FIG. 2) with default values. For example, the attributes 213 (FIG. 2) may be automatically populated with the user account information of the user who created the information object and an information object reference 209 (FIG. 2) may be automatically created to refer to related information object 223 corresponding to a parent or sibling information object 116.

Proceeding next to box 409, the client application 123 sends the newly created information object 116 to the collaboration server 113. In some embodiments, the newly created information object 116 may be serialized, for example by calling a function 219 (FIG. 2) of the information object 116 to serialize it, and then send the serialized information object 116 to the collaboration server 113. In various embodiments, the client application 113 may instead send a copy of the unique identifier 203, the content 206, and the form data 216 (FIG. 2) to the collaboration server 113.

Referring next to box 413, the collaboration server 113 determines whether or not the information corresponding to the newly created information object 116 is valid. For example, the collaboration server 113 might check for errors as part of the deserialization process. The collaboration server 113 may check to see if the data is formatted correctly. As another example, the collaboration server 113 may check to determine if the unique identifier 203 of the newly created information object 116 is duplicative of a unique identifier 203 of an information object 116 already existing in the data store 111 (FIG. 1), which indicates that either the newly created information object 116 is a duplicate or that there is a collision between the unique identifiers 203 of the two information objects 116 which needs to be resolved. If the information is invalid, then execution proceeds to box 446. If the information is valid, however, then execution proceeds to box 416.

If execution skips to box 446, the collaboration server 113 generates an error message event and sends an error message to the client application 123. The error message may include an error code identifying the type or source of the error, an error description, and a cause of the error. In some embodiments, the error message itself may be an information object 116 representing the error and including the applicable error information. In various embodiments, the collaboration server 113 may also log the error and any associated error information to the data store 111 or a log file for later analysis.

Moving on to box 416, the collaboration server 113 creates an information object 116 in the data store 111 using the information received from the client application 123. If necessary, the collaboration server 113 also creates any parent or child information objects required, as well as any references or connections between the newly created information object 116 and other existing information objects 116.

Referring next to box 419, the collaboration server 113 sends a notice to the client application 123 that the information object 116 has been created. The notice may be in the form of a message, event notifier, or other data format. Additionally, the collaboration server 113 may, in some embodiments, mark the newly created information object 116 as being currently modified or that modifications to the newly created information object 116 are in progress. This may lock the information object 116 or otherwise prevent the information object 116 from being modified by other users, applications, or processes while the information object 116 is being modified.

Proceeding to box 423, the client application 123 receives a notification from the collaboration server 113 that the information object 116 has been created. In some embodiments, the notification may also include an indication that the newly created information object 116 is marked for editing or modifications. If the newly created information object is marked for editing, the client application 123 may enable modifications to be made to the client or local copy of the information object 116. For example, the client application 123 may mark fields of the newly created information object 116 as editable, enable various menu functions for the information object 116, or take similar actions.

Moving on to box 426, the client application 123 obtains one or more user modifications to the newly created information object 116. In some embodiments, the client application 123 may automatically save the user modifications. For example, the client application 123 may automatically send each change to the collaboration server 113, or the client application 123 may send changes to the collaboration server 113 in batches on a periodic basis, such as every few minutes, every hour, or some other period of time. The client application 123 may also locally save changes or modifications to the newly created information object 116 on the client computing device 106 (FIG. 1). When the user has finished modifying the newly created information object 116, the final set of changes is sent to the collaboration server 113. In some embodiments, the changes sent may be sent in a file format that records the changes between the copy of the information object 116 stored in the data store 111 and the copy of the information object 116 stored on the client computing device 106. In various embodiments, the changes may instead be sent as copy of the information object 116 locally stored on the client computing device 106 to be used to replace the copy of the corresponding information object 116 stored in the data store 111. In such embodiments, the copy of the information object 116 may be serialized and transmitted to the collaboration server 113.

Referring next to box 429, the collaboration server 113 determines whether or not the information corresponding to the modified information object 116 is valid. For example, the collaboration server 113 might check for errors as part of the deserialization process. The collaboration server 113 may check to see if the data is formatted correctly. If the information is invalid, then execution proceeds to box 446, previously described. If the information is valid, however, then execution proceeds to box 433.

Proceeding next to box 433, the collaboration server 113 stores the modifications to the information object 116 in the data store 111. In some embodiments, this may be accomplished by overwriting or replacing a previous copy of information object 116 stored in the data store 111. In other embodiments, the content of the information object 116 may be edited or updated instead of overwriting the information object 116 with a newer copy or version.

Moving on to box 436, the collaboration server 113 sends a notice to the client application 123 that the updates to the information object 116 are completed. The notice may be in the form of a message, event notifier, or other data format. Additionally, the collaboration server 113 may mark the newly created information object 116 as being as editable, such that other users or processes waiting to make changes to the information object 116 may do so.

Referring next to box 439, the client application 123 receives the notice that the updates or changes to the newly created information object 116 are complete. In some embodiments, the client application 123 may lock or otherwise prevent users from modifying the newly created information object 116 upon receiving the notice. Execution then proceeds to box 443, where the client application 123 renders the newly created information object 116.

Figure 5:
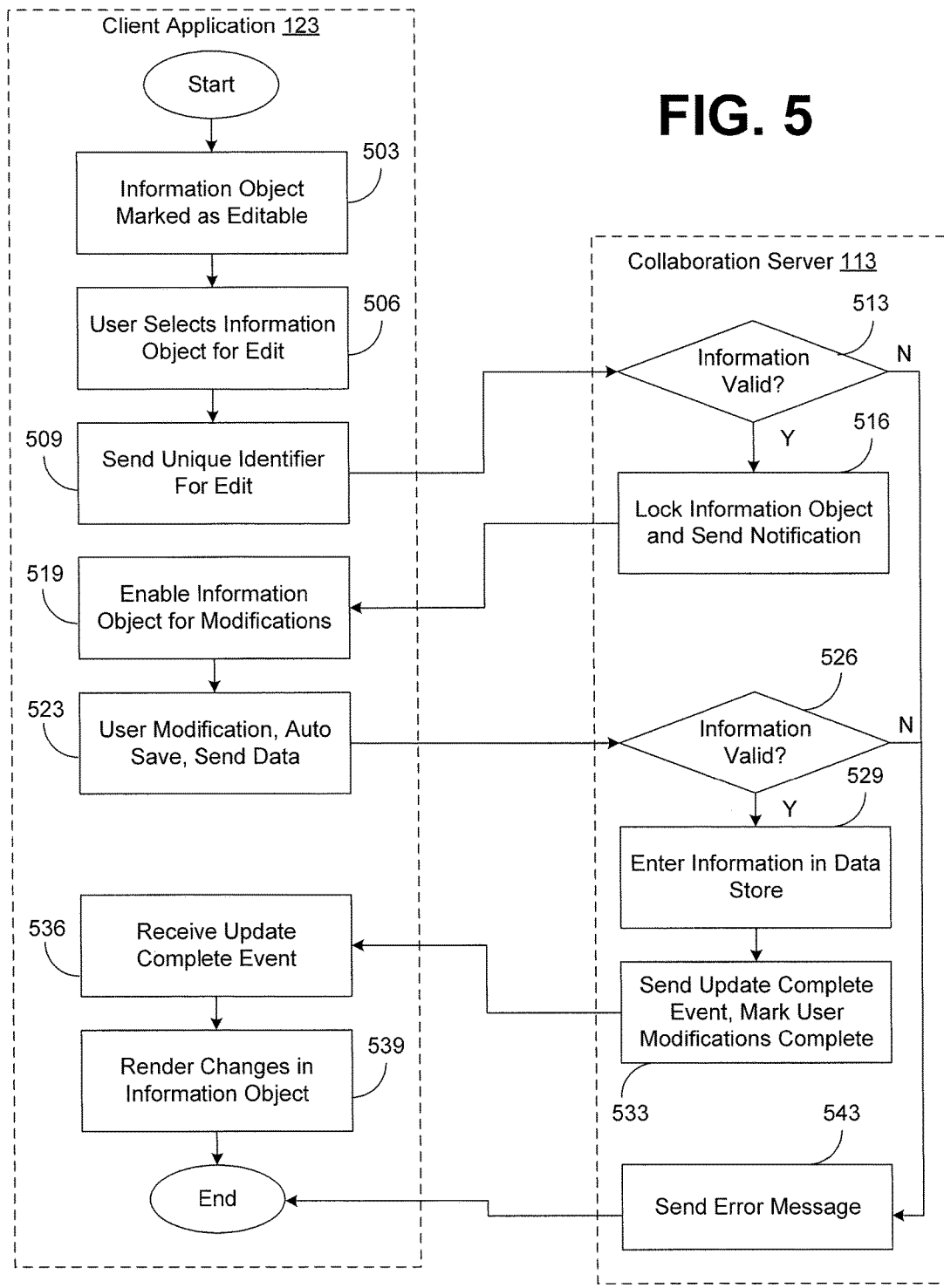
FIG. 5 is a flowchart illustrating one example of functionality implemented as portions of a client application and a collaboration server executed in the networked environment of FIG. 1 according to various embodiments of the present disclosure.

FIG. 5 shows a flowchart that provides one example of the operation of a portion of the client application 123 and the collaboration server 113 according to various embodiments. It is understood that the flowchart of FIG. 5 provides merely an example of the many different types of functional arrangements that may be employed to implement the operation of the portions of the client application 123 and the collaboration server 113 as described herein. As an alternative, the flowchart of FIG. 5 may be viewed as depicting an example of elements of a method implemented in the networked environment 100 (FIG. 1) according to one or more embodiments.

Beginning with box 503, the client application 123 marks an information object 116 as editable. For example, an information object 116 (FIG. 1) may be locked by another process or user for editing by the collaboration server 113. Accordingly, until the collaboration server 113 unlocks the information object 116 and communicates to the client application 123 that the information object 116 is free for editing, the information object 116 may not be editable by a user of the client application 123.

Subsequent to marking the information object 116 as editable, execution on the client application moves to box 506, where the client application 123 obtains a user selection of the information object 116 for editing. The user may, for example use a mouse click, touch gesture, or other interaction to indicate to the client application 123 that the information object 116 is to be edited.

Proceeding to box 509, the client application 123 retrieves the unique identifier 203 (FIG. 2) of the information object 116. Upon retrieval, the client application 123 sends the unique identifier 203 to the collaboration server 113.

Referring next to box 513, the collaboration server 113 determines whether or not the unique identifier 203 (FIG. 2) is valid. For example, the collaboration server 113 may determine whether an information object 116 in the data store 111 (FIG. 1) with the unique identifier 203 exists. If not, the collaboration server 113 may generate an error. As another example, the collaboration server 113 may further determine whether the information object 116 in the data store 111 is an editable information object 116. If not, the collaboration server 113 may generate an error. If the collaboration server 113 determines that the unique identifier 203 is invalid, then execution proceeds to box 543. If the information is valid, however, then execution proceeds to box 516.

If execution skips to box 543, the collaboration server 113 generates an error message event and sends an error message to the client application 123. The error message may include an error code identifying the type or source of the error, an error description, and a cause of the error. In some embodiments, the error message itself may be an information object 116 representing the error and including the applicable error information. In various embodiments, the collaboration server 113 may also log the error and any associated error information to the data store 111 or a log file for later analysis.

Moving on to box 516, the collaboration server 113 may mark the selected information object 116 as being currently modified or that modifications to the selected information object 116 are in progress. This may lock the information object 116 or otherwise prevent the information object 116 from being modified by other users, applications, or processes while the information object 116 is being modified. After locking the information object 116, the collaboration server 113 then sends a message to the client application 123 that the information object 116 may be edited.

Referring next to box 519, the client application 123 may enable modifications to be made to the client or local copy of the information object 116 in response to receiving the message from the collaboration server 113. For example, the client application 123 may mark fields of the selected information object 116 as editable, enable various menu functions for the information object 116, or take similar actions.

Proceeding to box 523, the client application 123 obtains one or more user modifications to the selected information object 116. In some embodiments, the client application 123 may automatically save the user modifications. For example, the client application 123 may automatically send each change to the collaboration server 113, or the client application 123 may send changes to the collaboration server 113 in batches on a periodic basis, such as every few minutes, every hour, or some other period of time. The client application 123 may also locally save changes or modifications to the selected information object 116 on the client computing device 106 (FIG. 1). When the user has finished modifying the selected information object 116, the final set of changes is sent to the collaboration server 113. In some embodiments, the changes sent may be sent in a file format that records the changes between the copy of the information object 116 stored in the data store 111 and the copy of the information object 116 stored on the client computing device 106. In various embodiments, the changes may instead be sent as a copy of the information object 116 locally stored on the client computing device 106 to be used to replace the copy of the corresponding information object 116 stored in the data store 111. In such embodiments, the copy of the information object 116 may be serialized and transmitted to the collaboration server 113.

Referring next to box 526, the collaboration server 113 determines whether or not the information corresponding to the modified information object 116 is valid. For example, the collaboration server 113 might check for errors as part of the deserialization process. The collaboration server 113 may check to see if the data is formatted correctly. If the information is invalid, then execution proceeds to box 543, previously described. If the information is valid, however, then execution proceeds to box 529.

Moving on to box 529, the collaboration server 113 stores the modifications to the information object 116 in the data store 111. In some embodiments, this may be accomplished by overwriting or replacing a previous copy of information object 116 stored in the data store 111. In other embodiments, the content of the information object 116 may edited or updated instead of overwriting the information object 116 with a newer copy or version.

Referring next to box 533, the collaboration server 113 sends a notice to the client application 123 that the updates to the information object 116 are completed. The notice may be in the form of a message, event notifier, or other data format. Additionally, the collaboration server 113 may mark the selected information object 116 as being as editable, such that other users or processes waiting to make changes to the information object 116 may do so.

Moving on to box 536, the client application 123 receives the notice that the updates or changes to the selected information object 116 are complete. In some embodiments, the client application 123 may lock or otherwise prevent users from modifying the selected information object 116 upon receiving the notice. Execution then proceeds to box 539, where the client application 123 renders the modified information object 116.

Figure 6:
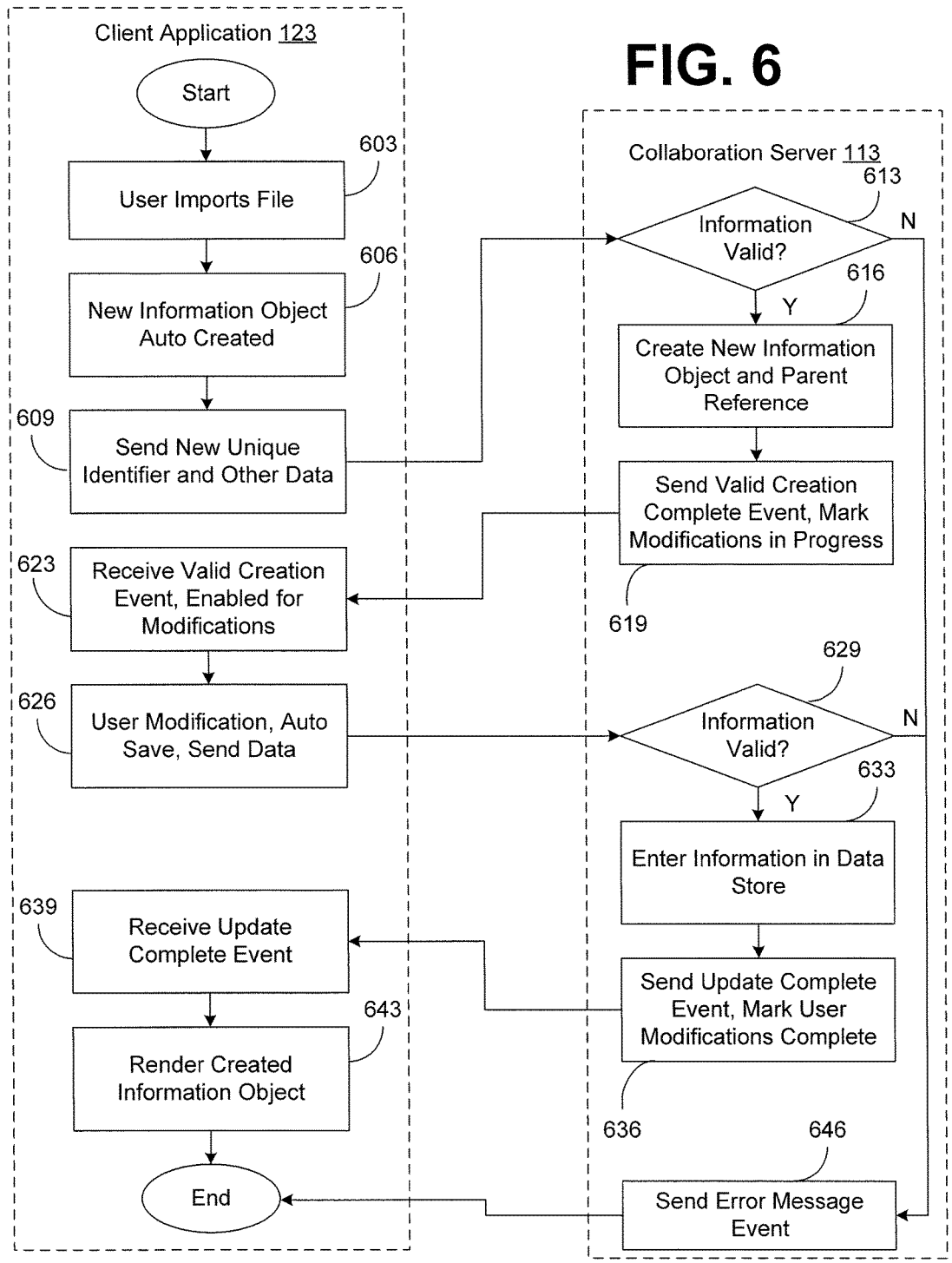
FIG. 6 is a flowchart illustrating one example of functionality implemented as portions of a client application and a collaboration server executed in the networked environment of FIG. 1 according to various embodiments of the present disclosure.

FIG. 6 shows a flowchart that provides one example of the operation of a portion of the client application 123 and the collaboration server 113 according to various embodiments. It is understood that the flowchart of FIG. 6 provides merely an example of the many different types of functional arrangements that may be employed to implement the operation of the portions of the client application 123 and the collaboration server 113 as described herein. As an alternative, the flowchart of FIG. 6 may be viewed as depicting an example of elements of a method implemented in the networked environment 100 (FIG. 1) according to one or more embodiments.

Beginning with box 603, the client application 123 receives information or data that is to be imported into the system. For example, the client application 123 may receive a video file, an image file, a portable document format (PDF) document, a text document, an audio file, or some other type of file.

Subsequently at box 606, the client application 123 analyzes the file and creates a new information object 116 locally based on the file. In some embodiments, the new information object 116 may be locally cached for immediate use by the client application 123 pending an upload of the newly created information object 116 to the collaboration server 113. In some embodiments, the client application 123 may further assign a unique identifier 203 (FIG. 2) to the newly created information object 116 and populate the content 206 (FIG. 2) and form data 216 (FIG. 2) with default values. For example, the attributes 213 (FIG. 2) may be automatically populated with the user account information of the user who created the information object and an information object reference 209 (FIG. 2) may be automatically created to refer to related information object 223 corresponding to a parent or sibling information object 116. Further, in some embodiments, the client application 123 may set values for certain attributes 209 based on the file and may populate the content 206 and form data 216 with values based at least in part on the imported file.

Proceeding next to box 609, the client application 123 sends the newly created information object 116 to the collaboration server 113. In some embodiments, the newly created information object 116 may be serialized, for example by calling a function 219 (FIG. 2) of the information object 116 to serialize it, and then send the serialized information object 116 to the collaboration server 113. In various embodiments, the client application 113 may instead send a copy of the unique identifier 203, the content 206, and the form data 216 to the collaboration server 113.

Referring next to box 613, the collaboration server 113 determines whether or not the information corresponding to the newly created information object 116 is valid. For example, the collaboration server 113 might check for errors as part of the deserialization process. The collaboration server 113 may check to see if the data is formatted correctly. As another example, the collaboration server 113 may check to determine if the unique identifier 203 of the newly created information object 116 is duplicative of a unique identifier 203 of an information object 116 already existing in the data store 111 (FIG. 1), which indicate that either the newly created information object 116 is a duplicate or that there is a collision between the unique identifiers 203 of the two information objects 116 which needs to be resolved. If the information is invalid, then execution proceeds to box 646. If the information is valid, however, then execution proceeds to box 616.

If execution skips to box 646, the collaboration server 113 generates an error message event and sends an error message to the client application 123. The error message may include an error code identifying the type or source of the error, an error description, and a cause of the error. In some embodiments, the error message itself may be an information object 116 representing the error and including the applicable error information. In various embodiments, the collaboration server 113 may also log the error and any associated error information to the data store 111 or a log file for later analysis.

Moving on to box 616, the collaboration server 113 creates an information object 116 in the data store 111 using the information received from the client application 123. If necessary, the collaboration server 113 also creates any parent or child information objects required, as well as any references or connections between the newly created information object 116 and other existing information objects 116.

Referring next to box 619, the collaboration server 113 sends a notice to the client application 123 that the information object 116 has been created. The notice may be in the form of a message, event notifier, or other data format. Additionally, the collaboration server 113 may, in some embodiments, mark the newly created information object 116 as being currently modified or that modifications to the newly created information object 116 are in progress. This may lock the information object 116 or otherwise prevent the information object 116 from being modified by other users, applications, or processes while the information object 116 is being modified.

Proceeding to box 623, the client application 123 receives a notification from the collaboration server 113 that the information object 116 has been created. In some embodiments, the notification may also include an indication that the newly created information object 116 is marked for editing or modifications. If the newly created information object is marked for editing, the client application 123 may enable modifications to be made to the client or local copy of the information object 116. For example, the client application 123 may mark fields of the newly created information object 116 as editable, enable various menu functions for the information object 116, or take similar actions.

Moving on to box 626, the client application 123 obtains one or more user modifications to the newly created information object 116. In some embodiments, the client application 123 may automatically save the user modifications. For example, the client application 123 may automatically send each change to the collaboration server 113, or the client application 123 may send changes to the collaboration server 113 in batches on a periodic basis, such as every few minutes, every hour, or some other period of time. The client application 123 may also locally save changes or modifications to the newly created information object 116 on the client computing device 106 (FIG. 1). When the user has finished modifying the newly created information object 116, the final set of changes is sent to the collaboration server 113. In some embodiments, the changes sent may be sent in a file format that records the changes between the copy of the information object 116 stored in the data store 111 and the copy of the information object 116 stored on the client computing device 106. In various embodiments, the changes may instead be sent as copy of the information object 116 locally stored on the client computing device 106 to be used to replace the copy of the corresponding information object 116 stored in the data store 111. In such embodiments, the copy of the information object 116 may be serialized and transmitted to the collaboration server 113.

Referring next to box 629, the collaboration server 113 determines whether or not the information corresponding to the modified information object 116 is valid. For example, the collaboration server 113 might check for errors as part of the deserialization process. The collaboration server 113 may check to see if the data is formatted correctly. If the information is invalid, then execution proceeds to box 646, previously described. If the information is valid, however, then execution proceeds to box 633.

Proceeding next to box 633, the collaboration server 113 stores the modifications to the information object 116 in the data store 111. In some embodiments, this may be accomplished by overwriting or replacing a previous copy of information object 116 stored in the data store 111. In other embodiments, the content of the information object 116 may edited or updated instead of overwriting the information object 116 with a newer copy or version.

Moving on to box 636, the collaboration server 113 sends a notice to the client application 123 that the updates to the information object 116 are completed. The notice may be in the form of a message, event notifier, or other data format. Additionally, the collaboration server 113 may mark the newly created information object 116 as being as editable, such that other users or processes waiting to make changes to the information object 116 may do so.

Referring next to box 639, the client application 123 receives the notice that the updates or changes to the newly created information object 116 are complete. In some embodiments, the client application 123 may lock or otherwise prevent users from modifying the newly created information object 116 upon receiving the notice. Execution then proceeds to box 643, where the client application 123 renders the newly created information object 116.

Figure 7:
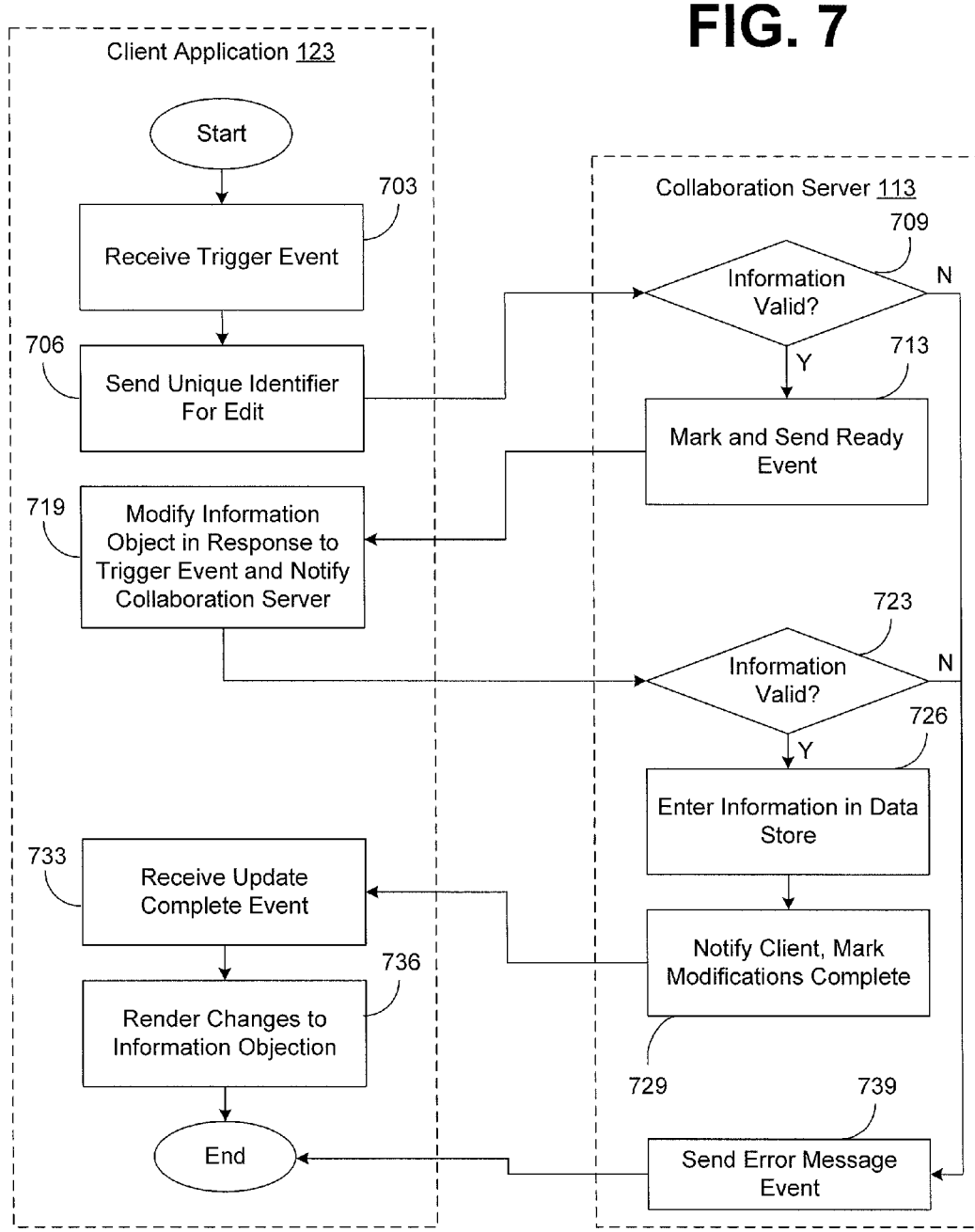
FIG. 7 is a flowchart illustrating one example of functionality implemented as portions of a client application and a collaboration server executed in the networked environment of FIG. 1 according to various embodiments of the present disclosure.

FIG. 7 shows a flowchart that provides one example of the operation of a portion of the client application 123 and the collaboration server 113 according to various embodiments. It is understood that the flowchart of FIG. 7 provides merely an example of the many different types of functional arrangements that may be employed to implement the operation of the portions of the client application 123 and the collaboration server 113 as described herein. As an alternative, the flowchart of FIG. 7 may be viewed as depicting an example of elements of a method implemented in the networked environment 100 (FIG. 1) according to one or more embodiments.

Beginning with box 703, the client application 123 receives a trigger event. The trigger event includes any event which indicates that the information object 116 associated with the trigger event should be modified. A trigger event may include, for example, a command received by the user interface 300 (FIG. 1) to automatically arrange or layout the displayed information objects 116 according to one or more predefined rules. The user interface may then send a trigger to the corresponding information objects 116 to modify their form data 216 according to the one or more predefined rules. For example, the trigger event may instruct the information objects 116 may alter their position, size or shape values stored in the form data 216.

Proceeding to box 706, the client application 123 retrieves the unique identifier 203 (FIG. 2) of the information object 116 that corresponds to the trigger event. Upon retrieval, the client application 123 sends the unique identifier 203 to the collaboration server 113.

Referring next to box 709, the collaboration server 113 determines whether or not the unique identifier 203 (FIG. 2) is valid. For example, the collaboration server 113 may determine whether an information object 116 in the data store 111 (FIG. 1) with the unique identifier 203 exists. If not, the collaboration server 113 may generate an error. As another example, the collaboration server 113 may further determine whether the information object 116 in the data store 111 is an editable information object 116. If not, the collaboration server 113 may generate an error. If the collaboration server 113 determines that the unique identifier 203 is invalid, then execution proceeds to box 739. If the information is valid, however, then execution proceeds to box 713.

If execution skips to box 739, the collaboration server 113 generates an error message event and sends an error message to the client application 123. The error message may include an error code identifying the type or source of the error, an error description, and a cause of the error. In some embodiments, the error message itself may be an information object 116 representing the error and including the applicable error information. In various embodiments, the collaboration server 113 may also log the error and any associated error information to the data store 111 or a log file for later analysis.

Moving on to box 713, the collaboration server 113 may mark the information object 116 as being currently modified or that modifications to the information object 116 are in progress. This may lock the information object 116 or otherwise prevent the information object 116 from being modified by other users, applications, or processes while the information object 116 is being modified. After locking the information object 116, the collaboration server 113 then sends a message to the client application 123 that the information object 116 may be edited.

Proceeding to box 719, the client application 123 modifies the information object 116 in response to the trigger according to the conditions associated with the trigger. In some embodiments, the changes may be automatically saved locally on the client computing device 106 (FIG. 1) pending the changes being sent to the collaboration server 113.

Referring next to box 723, the collaboration server 113 determines whether or not the information corresponding to the modified information object 116 is valid. For example, the collaboration server 113 might check for errors as part of the deserialization process. The collaboration server 113 may check to see if the data is formatted correctly. If the information is invalid, then execution proceeds to box 739, previously described. If the information is valid, however, then execution proceeds to box 526.

Moving on to box 726, the collaboration server 113 stores the modifications to the information object 116 in the data store 111. In some embodiments, this may be accomplished by overwriting or replacing a previous copy of information object 116 stored in the data store 111. In other embodiments, the content of the information object 116 may edited or updated instead of overwriting the information object 116 with a newer copy or version.

Referring next to box 729, the collaboration server 113 sends a notice to the client application 123 that the updates to the information object 116 are completed. The notice may be in the form of a message, event notifier, or other data format. Additionally, the collaboration server 113 may mark the newly created information object 116 as being as editable, such that other users or processes waiting to make changes to the information object 116 may do so.

Moving on to box 733, the client application 123 receives the notice that the updates or changes to the information object 116 are complete. In some embodiments, the client application 123 may lock or otherwise prevent users from modifying the information object 116 upon receiving the notice. Execution then proceeds to box 736, where the client application 123 renders the modified information object 116.

Figure 8:
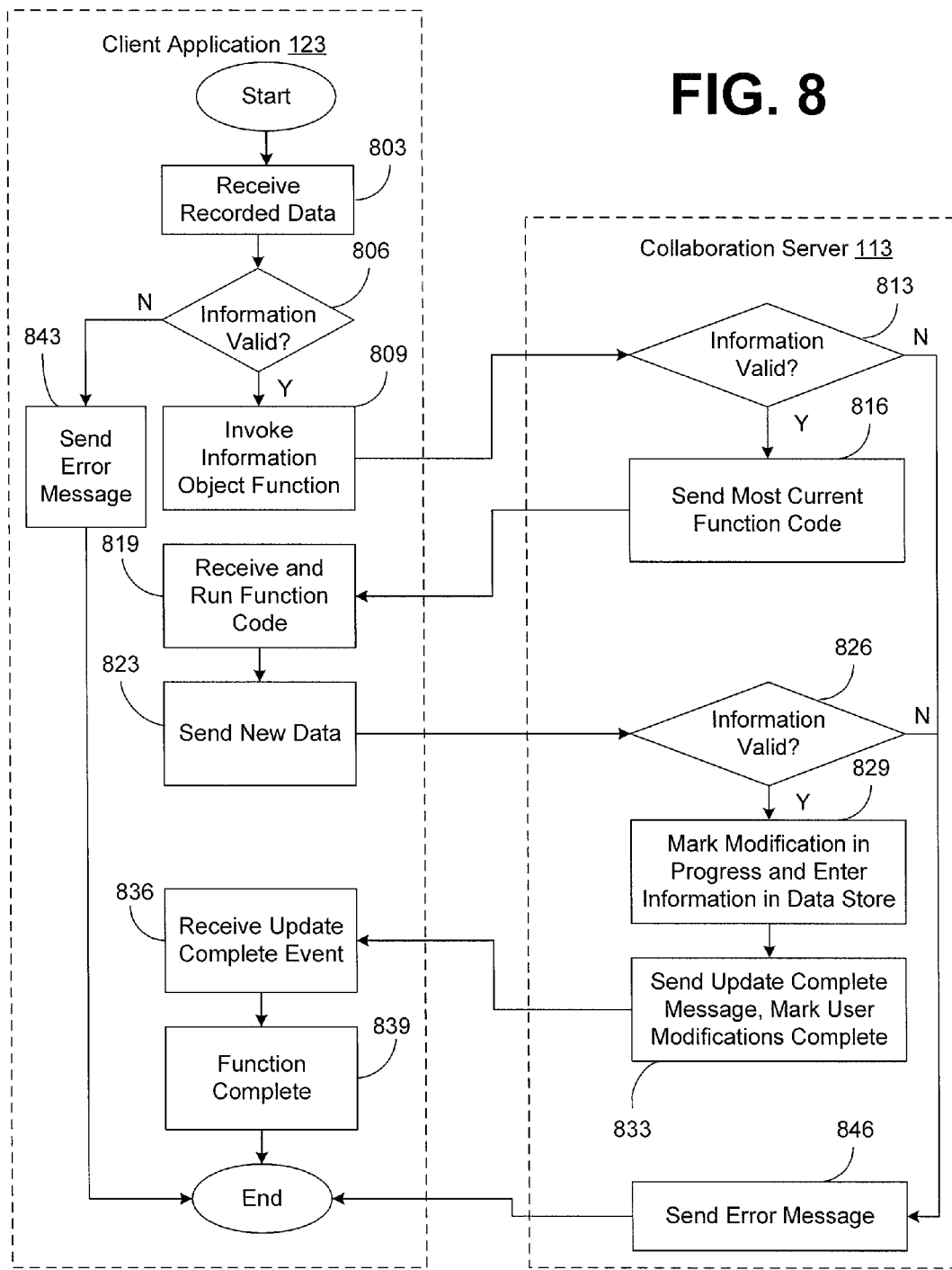
FIG. 8 is a flowchart illustrating one example of functionality implemented as portions of a client application and a collaboration server executed in the networked environment of FIG. 1 according to various embodiments of the present disclosure.

FIG. 8 shows a flowchart that provides one example of the operation of a portion of the client application 123 and the collaboration server 113 according to various embodiments. It is understood that the flowchart of FIG. 8 provides merely an example of the many different types of functional arrangements that may be employed to implement the operation of the portions of the client application 123 and the collaboration server 113 as described herein. As an alternative, the flowchart of FIG. 8 may be viewed as depicting an example of elements of a method implemented in the networked environment 100 (FIG. 1) according to one or more embodiments.

Beginning with box 803, the client application 123 receives data from a data source to be added to an existing information object 116 (FIG. 1). The data source, for example, may include one or more sensors and/or other data feeds 126 (FIG. 1). Data may be received as an information object 116 or a series of information objects 116. For example, a temperature sensor may record a series of temperatures and supply them to the client application 123 as a series of information objects 116 or as a single information object 116 representing the stream or series of temperature readings. In some embodiments, the sensors and/or other data feeds may supply the data as a raw data that has not yet been processed into one or more information objects 116. It is also noted that in some embodiments, the sensors and/or other data feeds 126 may supply information directly to the collaboration server 113.

Referring next to box 806, the client application 123 validates the information supplied by the one or more sensors and/or other data feeds 126. Validation may depend on the type of information supplied by the one or more sensors and/or other data feeds 126. If the data is received in the form of an information object 116, the client application 123 may determine whether or not the information object is validly formatted and constructed. If the data is received as raw data, the client application 123 may perform validation checks on the data received. If the data received is invalid, execution skips to box 843. If the data received is valid, then execution proceeds to box 809.

If execution skips to box 843, the client application sends an error message to the sensor and/or other data feed 126 indicating that the data or information object 116 received is invalided. In some embodiments, the client application 123 may also generate an error message to be rendered within the user interface 300 (FIG. 1) and/or write the error or error message to a log. The process then terminates.

If execution proceeds to box 809, however, then the client application 123 invokes one or more functions 219 (FIG. 2) of the existing information object 116. As part of the invocation process, the client application 123 may query or send a request to the collaboration server 113 for a copy of the latest or most current version of the function 219 to be invoked. For example, if the data supplied by the one or more sensors and/or other data feeds 126 were temperature data or a series of temperature readings, then the client application 123 may invoke an "AddNewTemperatureReading" function 219 of the existing information object 116 to add the data received by adding an information object reference 209 (FIG. 2) to the existing information object 116 that creates an association between the existing information object 116. In some embodiments, a generic "AddNewData" function 219 may be invoked to create an information object reference 209 between the data received and existing information object 116.

Proceeding next to box 813, the collaboration server 113 determines whether the information provided is valid. For example, the collaboration server may determine whether the arguments supplied by the client application 123 with respect with the function 219 to be called are correct. To use the illustrative example of a temperature sensor, the collaboration server may determine whether the client application 123 is passing temperature readings to an "AddNewTemperatureReading" function 219 or whether the client application 123 is attempting to pass arguments that are unrelated to temperature data. As another example, the collaboration server 113 may determine whether the request for the most current version of the function 219 is valid. As an example, the requested function might not exist or might have been deprecated or removed from the current implementation of the system, and therefore the function may no longer be available to be called. In some embodiments, a subset of functions 219 may require elevated or special permissions to execute, and therefore the collaboration server 113 must determine whether the client application 213 has the appropriate permissions to execute the function 219. If the collaboration server 113 determines that the request is for the most recent version of the function 219 is invalid, execution skips to box 846. However, if the collaboration server 113 determines that the request is valid, then execution proceeds to box 816.

Skipping ahead to box 846, the collaboration server 113 generates an error message event and sends an error message to the client application 123. The error message may include an error code identifying the type or source of the error, an error description, and a cause of the error. In some embodiments, the error message itself may be an information object 116 representing the error and including the applicable error information. In various embodiments, the collaboration server 113 may also log the error and any associated error information to the data store 111 (FIG. 1) or a log file for later analysis.

Referring next to box 816, the collaboration server 113 queries the data store 111 to determine the most current version of the function 219 which the client application 123 has requested to execute. The collaboration server 113 then sends the code or logic for the most current or recent version of the function 219 to the client application 123. In some embodiments, the function 219 may be sent as human readable source code. In other embodiments, the function 219 may be serialized and sent to the client application 123.

Moving on to box 819, the client application 123 receives the most recent version of the function 219 from the collaboration server 113. If the function 219 is provided as human readable source code, the client application 123 may compile or interpret the human readable source code into a machine readable binary. If the function 219 has been sent in a serialized form, the function 219 may be deserialized by the client application 123. The client application 123 then executes the function 219.

Proceeding next to box 823, the results of the function 219 executed in box 819 are sent to the collaboration server 113. In some embodiments, the results may be sent as a newly created information object 116 or set of information objects 116.

Referring next to box 826, the collaboration server 113 determines whether the results of the function invoked in box 819 are valid. For example, the collaboration server 113 may determine whether the resulting information objects 116 are formatted correctly. As another example, the collaboration server 113 may determine whether a collision exists between the resulting information object 116 or objects 116 and any preexisting information objects 116 in the data store 111. If the results are invalid, then execution skips to box 846, as previously described. If the results are valid, then execution instead proceeds to box 829.

Moving on to box 829, the collaboration server 113 marks the initial information object 116 as being modified. This locks or otherwise prevents the initial information object 116 from being modified by other client applications 123 or processes. The collaboration server then saves the data or information objects 116 resulting from the function 219 executed in box 819 to the data store 111 and also saves any modifications necessary to link the initial information object 116 to the newly created information objects 116.

Proceeding next to box 833, the collaboration server 113 marks the respective information objects 116 as having been modified, unlocking the information objects 116 such that other client applications 123 or other processes may read or modify them. The collaboration server 113 then sends a message to the client application 123 indicating that all changes to the respective information objects 116 are complete. Referring next to box 836, the client application 123 receives notification from the collaboration server 113 that the updates to the information objects 116 in the data store 111 have been completed. Moving on to box 839, the function 219 invoked in box 809 and executed in box 819 completes, and the function 219 ends.

Figure 9:
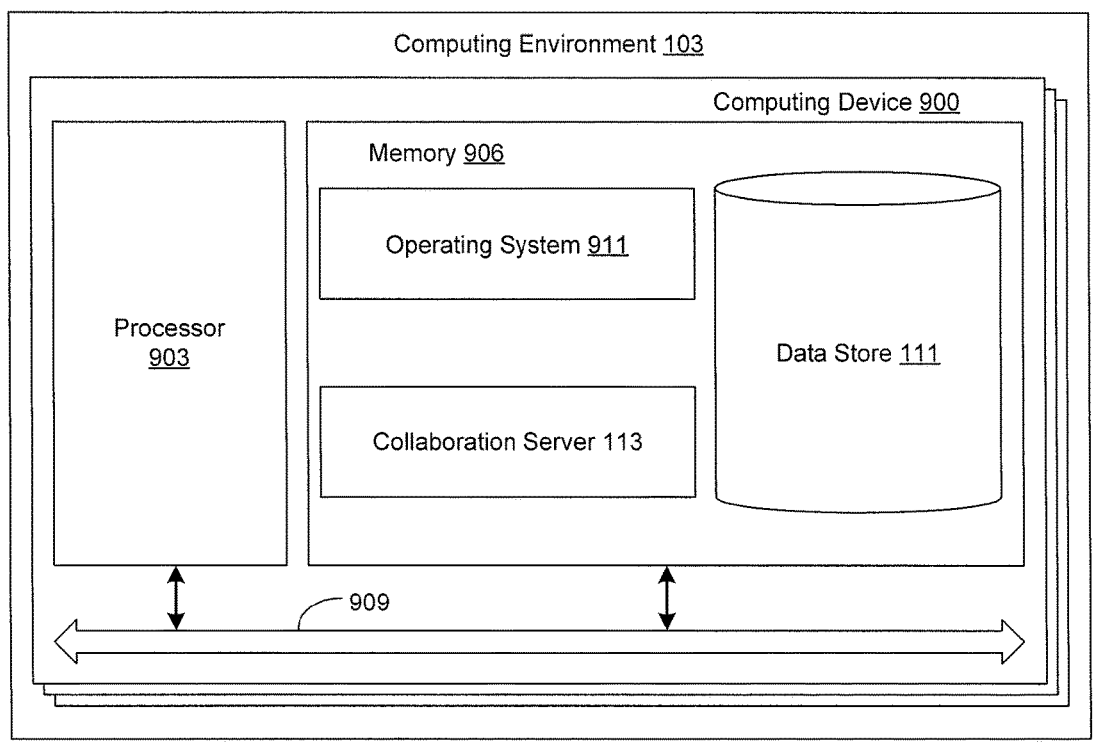
FIG. 9 is a schematic block diagram that provides one example illustration of a computing environment employed in the networked environment of FIG. 1 according to various embodiments of the present disclosure.

With reference to FIG. 9, shown is a schematic block diagram of the computing environment 103 according to an embodiment of the present disclosure. The computing environment 103 includes one or more computing devices 900. Each computing device 900 includes at least one processor circuit, for example, having a processor 903 and a memory 906, both of which are coupled to a local interface 909. To this end, each computing device 900 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are collaboration server 113, and potentially other applications. Also stored in the memory 906 may be a data store 111 and other data. In addition, an operating system 911 may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and/or multiple processor cores and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although collaboration server 113 and the client application 123, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The functionality and operation of an implementation of portions of the collaboration server 113 or the client application 123 may be described in the present disclosure. If embodied in software, the functionality described may represent a module, segment, or portion of code that comprises program instructions to implement the specified logical functions. The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although a specific order of execution for the application may be described, it is understood that the order of execution may differ from that which is depicted. Functionality described may be implemented concurrently or in parallel with other described functionality. Moreover, functionality described may occur in an order other than that described or depicted in the present disclosure. Further, in some embodiments, functionality described herein may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including collaboration server 113 and the client application 123, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

I claim:

1. A non-transitory computer-readable medium comprising machine readable instructions that, when executed by a processor of a client computing device, cause the client computing device to at least:
   generate a user interface on the client computing device;
   query a collaboration server for an information object to be rendered within the user interface on behalf of a user in response to a request to render the information object, wherein the information object represents at least a set of associations between a plurality of other information objects and the information object comprises form data and a function:
      the form data comprising a set of specified values for rendering the information object within the user interface based at least in part on the set of associations between the plurality of other information objects, and the function comprising a programmatic interface for manipulating the information object;

extract the form data from the information object received from the collaboration server; and render the information object within the user interface based at least in part on the form data of the information object.

2. The non-transitory computer-readable medium of claim 1, further comprising machine readable instructions that, when executed by the processor of the client computing device, cause the client computing device to at least:

retrieve an identification of a related information object from the information object;

query the collaboration server for the related information object; and render the related information object within the user interface based at least in part on the form data extracted from the information object.

3. The non-transitory computer-readable medium of claim 2, further comprising machine readable instructions that, when executed by the processor of the client computing device, cause the client computing device to at least render within the user interface an indication of a relationship between the information object and the related information object.

4. The non-transitory computer-readable medium of claim 1, further comprising machine readable instructions that, when executed by the processor of the client computing device, cause the client computing device to at least:

obtain a modification of the information object;

send the modification to the collaboration server;

render a modified version of the information object within the user interface in response to receiving a notification from the collaboration server that the modification is valid; and render an error message within the user interface in response to receiving a notification from the collaboration server that the modification is invalid.

5. The non-transitory computer-readable medium of claim 1, wherein the information object further comprises at least one of a universally unique identifier or an information object reference.

6. The non-transitory computer-readable medium of claim 1, further comprising machine readable instructions that, when executed by the processor of the client computing device, cause the client computing device to at least:

generate a new information object in response to receiving data from a data source;

create an information object reference linking the information object to the new information object; and send the information object, the new information, and the information object reference to the collaboration server.

7. The non-transitory computer-readable medium of claim 6, wherein the data source comprises an electronic device that generates data and transmits the data to the client computing device.

8. A system, comprising:

a computing device comprising a processor and a memory;

an application comprising machine readable instructions stored in the memory and executable by the processor to cause the computing device to at least:

generate a user interface on a client computing device;

query a collaboration server for an information object to be rendered within the user interface on behalf of a user in response to a request to render the information object, wherein the information object represents at least a set of associations between a plurality of other information objects and the information object comprises form data and a function:

the form data comprising a set of specified values for rendering the information object within the user interface based at least in part on the set of associations between the plurality of other information objects, and the function comprising a programmatic interface for manipulating the information object;

extract form data from the information object received from the collaboration server; and render the information object within the user interface based at least in part on the form data of the information object.

9. The system of claim 8, wherein the application further comprises machine readable instructions stored in the memory and executable by the processor to cause the computing device to further:

retrieve an identification of a related information object from the information object;

query the collaboration server for the related information object; and render the related information object within the user interface based at least in part on the form data extracted from the information object.

10. The system of claim 9, wherein the application further comprises machine readable instructions stored in the memory and executable by the processor to cause the computing device to further render within the user interface an indication of a relationship between the information object and the related information object.

11. The system of claim 8, wherein the application further comprises machine readable instructions stored in the memory and executable by the processor to cause the computing device to further:

obtain a modification of the information object;

send the modification to the collaboration server;

render a modified version of the information object within the user interface in response to receiving a notification from the collaboration server that the modification is valid; and render an error message within the user interface in response to receiving a notification from the collaboration server that the modification is invalid.

12. The system of claim 8, wherein the information object further comprises at least one of a universally unique identifier or an information object reference.

13. The system of claim 8, wherein the application further comprises machine readable instructions stored in the memory and executable by the processor to cause the computing device to further:

generate a new information object in response to receiving data from a data source;

create an information object reference linking the information object to the new information object; and send the information object, the new information, and the information object reference to the collaboration server.

14. The system of claim 13, wherein the data source comprises an electronic device that generates data and transmits the data to the computing device.

15. A method, comprising:
generating, via a computing device, a user interface on the computing device;
querying, via the computing device, a collaboration server for an information object to be rendered within the user interface on behalf of a user in response to a request to render the information object, wherein the information object represents at least a set of associations between a plurality of other information objects and the information object comprises form data and a function:
   the form data comprising a set of specified values for rendering the information object within the user interface based at least in part on the set of associations between the plurality of other information objects, and
the function comprising a programmatic interface for manipulating the information object;
extracting, via the computing device, form data from the information object received from the collaboration server; and
rendering, via the computing device, the information object within the user interface based at least in part on the form data of the information object.

16. The method of claim 15, further comprising:
retrieving, via the computing device, an identification of a related information object from the information object;
querying, via the computing device, the collaboration server for the related information object; and
rendering, via the computing device, the related information object within the user interface based at least in part on the form data extract from the information object.

17. The method of claim 16, further comprising rendering, via the computing device, within the user interface an indication of a relationship between the information object and the related information object.

18. The method of claim 15, further comprising:
obtaining, via the computing device, a modification of the information object;
sending, via the computing device, the modification to the collaboration server;
rendering, via the computing device, a modified version of the information object within the user interface in response to receiving a notification from the collaboration server that the modification is valid; and
rendering, via the computing device, an error message within the user interface in response to receiving a notification from the collaboration server that the modification is invalid.

19. The method of claim 15, wherein the information object further comprises at least one of a universally unique identifier or an information object reference.

20. The method of claim 15, further comprising:
generating, via the computing device, a new information object in response to receiving data from a data source;
creating, via the computing device, an information object reference linking the information object to the new information object; and
sending, via the computing device, the information object, the new information, and the information object reference to the collaboration server.

21. The method of claim 20, wherein the data source comprises an electronic device that generates data and transmits the data to the computing device.

* * * * *